US012665201B2

(12) United States Patent
Ge et al.

(10) Patent No.: US 12,665,201 B2
(45) Date of Patent: Jun. 23, 2026

(54) CURRENT COLLECTOR, MANUFACTURING METHOD AND EQUIPMENT THEREOF, AND CURRENT COLLECTOR PREFORM

(71) Applicant: CONTEMPORARY AMPEREX TECHNOLOGY (HONG KONG) LIMITED, Hong Kong (CN)

(72) Inventors: Xiaoming Ge, Ningde (CN); Yujie Chen, Ningde (CN); Feng Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 208 days.

(21) Appl. No.: 18/388,531

(22) Filed: Nov. 10, 2023

(65) Prior Publication Data
US 2024/0079603 A1    Mar. 7, 2024

Related U.S. Application Data

(63) Continuation of application No. PCT/CN2022/101316, filed on Jun. 24, 2022.

(30) Foreign Application Priority Data

Apr. 21, 2022    (CN) .......................... 202210420518.5

(51) Int. Cl.
*H01M 4/80*        (2006.01)
*H01M 4/66*        (2006.01)
*H01M 50/213*    (2021.01)

(52) U.S. Cl.
CPC ........... *H01M 4/808* (2013.01); *H01M 4/661* (2013.01); *H01M 50/213* (2021.01); *H01M 2220/20* (2013.01)

(58) Field of Classification Search
CPC .......... C22C 1/088; C22C 1/08; H01M 4/808; H01M 4/661; H01M 4/139; H01M 4/04;
(Continued)

(56) References Cited

U.S. PATENT DOCUMENTS 5,578,397 A * 11/1996 Verhoog ............. H01M 50/536
29/623.5
6,214,490 B1    4/2001 Pate
(Continued)

FOREIGN PATENT DOCUMENTS

CN            2469560 Y        1/2002
CN        105706275 A        6/2016
(Continued)

OTHER PUBLICATIONS

Extended European Search Report issued Jul. 22, 2024 in European Patent Application No. 22926332.2.
(Continued)

*Primary Examiner* — Kiran Quraishi Akhtar
(74) *Attorney, Agent, or Firm* — XSENSUS LLP

(57) ABSTRACT

The present application discloses a current collector, and manufacturing method and equipment thereof, and a current collector preform, wherein the current collector may include a porous foam metal part and solid metal part(s); the porous foam metal part may be uncompressed, and the porous foam metal part may include a first edge and a second edge oppositely distributed in a first direction, the first direction may be perpendicular to the thickness direction of the current collector; the first edge and/or the second edge may be connected with the solid metal part(s).

9 Claims, 8 Drawing Sheets

(58) Field of Classification Search
CPC ........ H01M 4/13; H01M 4/80; H01M 50/213; H01M 50/204; H01M 2220/20; Y02E 60/10
See application file for complete search history.

(56) References Cited

U.S. PATENT DOCUMENTS

| | | | |
|---|---|---|---|
| 6,238,819 B1 | 5/2001 | Cahill et al. | |
| 2012/0308886 A1 | 12/2012 | Goto et al. | |
| 2019/0173093 A1* | 6/2019 | Liang | H01M 4/0404 |
| 2019/0198883 A1 | 6/2019 | Yamamoto et al. | |
| 2021/0043896 A1* | 2/2021 | Sasaki | H01G 11/18 |

FOREIGN PATENT DOCUMENTS

| | | |
|---|---|---|
| CN | 105932295 A | 9/2016 |
| CN | 106711462 A | 5/2017 |
| CN | 106972122 A | 7/2017 |
| CN | 110421268 A | 11/2019 |
| CN | 111370705 A | 7/2020 |
| CN | 111375882 A | 7/2020 |
| CN | 114520336 A | 5/2022 |
| EP | 0626733 A1 | 11/1994 |
| WO | 2016/185452 A1 | 11/2016 |

OTHER PUBLICATIONS

International Search Report and Written Opinion mailed on Jan. 16, 2023, received for PCT Application PCT/CN2022/101316, filed on Jun. 24, 2022, 20 pages including English Translation.
Notice of Grant of Invention mailed on May 30, 2022, received for JP Application 202210420518.5, 8 pages including English Translation.

\* cited by examiner

2000

1

CURRENT COLLECTOR, MANUFACTURING METHOD AND EQUIPMENT THEREOF, AND CURRENT COLLECTOR PREFORM

CROSS-REFERENCE TO RELATED APPLICATIONS

The present application is a continuation of International Application No. PCT/CN2022/101316, filed Jun. 24, 2022, which claims the priority to Chinese patent application No. 2022104205185, entitled "Current Collector, Manufacturing Method and Equipment Thereof, and Current Collector Preform" filed on Apr. 21, 2022, the entire content of each of which is incorporated herein by reference.

TECHNICAL FIELD

The present application relates to the field of batteries, and in particular to a current collector, a manufacturing method and equipment thereof, and a current collector preform.

BACKGROUND ART

In an electrode assembly using foam metal as a current collector, the current collector in the form of foam metal is difficult to be connected to a housing by laser welding, resulting in increased difficulty in the production process of the battery cell.

SUMMARY

In view of the above problem, the present application provides a current collector, a manufacturing method and equipment thereof, and a current collector preform, which can alleviate the problem that the current collector in the form of foam metal is difficult to be connected to the housing by laser welding.

In a first aspect, the present application provides a current collector, including a porous foam metal part and a solid metal part, wherein the porous foam metal part is uncompressed, and the porous foam metal part includes a first edge and a second edge oppositely distributed in a first direction, the first direction is perpendicular to the thickness direction of the current collector, and the first edge and/or the second edge are connected with the solid metal part.

In the technical solution of the embodiment of the present application, the solid metal part is connected to the edge of the porous foam metal part, and the solid metal part is used as the welding area of the current collector. When laser welding is performed, the solid metal part can effectively prevent laser leakage, and thus effectively avoid occurrence of the phenomenon of scalding the electrode assembly, failing to form a molten pool, and easily forming an explosion point, thereby alleviating the problem that the current collector in the form of foam metal is difficult to be connected to the housing by laser welding.

In some embodiments, the thickness of the solid metal part is less than or equal to the thickness of the porous foam metal part. In this design, the thickness of the solid metal part is configured to not exceed the thickness of the porous foam metal part, and in the thickness direction of the current collector, the solid metal part is prevented from exceeding the porous foam metal part, thereby preventing the solid metal part from arching a separator, and ensuring that the porous foam metal part can be better attached to the separator.

2

In some embodiments, in the solid metal part connected with the first edge and/or the second edge, in the first direction, the thickness of the end of the solid metal part away from the porous foam metal part is smaller than the thickness of the end of the solid metal part close to the porous foam metal part. In this design, the solid metal part is provided in such a way that the thickness of the end away from the porous foam metal part is smaller than the thickness of the end close to the porous foam metal part, so the thickness of the end of the solid metal part close to the porous foam metal part is relatively large, which is beneficial for the solid metal part to be connected to the porous foam metal part more stably, and the thickness of the end of the solid metal part away from the porous foam metal part is relatively small, which is convenient for performing cutting and laser welding operations.

In some embodiments, the solid metal part has a first metal segment, wherein in the first direction, the thickness of the first metal segment gradually decreases from the end close to the porous foam metal part to the end away from the porous foam metal part. In this design, in order to provide the solid metal part in such a way that the thickness of the end away from the porous foam metal part is relatively small, the first metal segment, whose thickness gradually decreases in the direction away from the porous foam metal part, is provided in the solid metal part, and through the smooth transition of the first metal segment, the solid metal part is enabled to have a smooth surface and can be easy to form.

In some embodiments, the surface of the first metal segment distributed in the thickness direction of the current collector is an arc-shaped surface, wherein in the thickness direction of the current collector, the arc-shaped surface bends toward the thickness center of the current collector. In this design, the first metal segment is provided in the form of arc transition, and the first metal segment is conveniently realized by pressing, so that the forming of the solid metal part is more convenient.

In some embodiments, the solid metal part has a second metal segment. In the first direction, the second metal segment is connected to one end of the first metal segment away from the porous foam metal part, and the thickness of the second metal segment is equal to the thickness of the end of the first metal segment away from the porous foam metal part. In this design, the second metal segment is provided at the end of the first metal segment away from the porous foam metal part, and the thickness of the second metal segment is equal to the thickness of the end of the first metal segment away from the porous foam metal part, the second metal segment is connected with the first metal segment smoothly and stably, and it is convenient to form, directly by means of pressing, the solid metal part having the second metal segment and the first metal segment; and the second metal segment may also provide more operating positions for performing cutting and laser welding operations, enabling more convenient performing of cutting and laser welding operations.

In some embodiments, the solid metal part has a third metal segment. In the first direction, the third metal segment is connected between the porous foam metal part and the first metal segment, with the thickness of the third metal segment=(0.95~1)×thickness of the porous foam metal part. In this design, the third metal segment is provided between the foam metal and the first metal segment, the thickness of the third metal segment is basically the same as that of the porous foam metal part, and in the thickness direction of the current collector, the third metal segment has better supporting ability, which can effectively avoid the pressure deformation of the porous foam metal part due to that the current collector is pressed.

In some embodiments, the solid metal part has a third metal segment. In the first direction, the third metal segment is connected between the porous foam metal part and the first metal segment, with the thickness of the third metal segment=(0.95~1)×thickness of the porous foam metal part. In this design, the third metal segment is provided between the foam metal and the first metal segment, the thickness of the third metal segment is basically the same as the thickness of the porous foam metal part, and in the thickness direction of the current collector, the third metal segment has better supporting ability, which can effectively avoid the pressure deformation of the porous foam metal part due to that the current collector is pressed.

In some embodiments, the thickness of the third metal segment is equal to the thickness of the end of the first metal segment close to the porous foam metal part. In this design, the thickness of the end of the first metal segment close to the porous foam metal part is equal to the thickness of the third metal segment, and the third metal segment is connected with the first metal segment smoothly and stably, and it is convenient to form, directly by means of pressing, the solid metal part having the third metal segment and the first metal segment.

In some embodiments, the solid metal part has a third metal segment, with the thickness of the third metal segment=(0.95~1)×thickness of the porous foam metal part. In this design, the third metal segment is provided in the solid metal part, the thickness of the third metal segment is basically the same as the thickness of the porous foam metal part, and in the thickness direction of the current collector, the third metal segment has better supporting ability, which can effectively avoid the pressure deformation of the porous foam metal part due to that the current collector is pressed.

In some embodiments, the surface of the third metal segment distributed in the thickness direction of the current collector is covered with an insulating layer. In this design, in the thickness direction of the current collector, the surface of the third metal segment is covered with the insulating layer, which can avoid increase of local expansion force caused by deposition of lithium metal, etc. on the surface of the filler.

In some embodiments, the thickness of a single insulating layer is ≥50 nm, and/or the thickness of the single insulating layer is ≤200 nm. In this design, the thickness of the single insulating layer is controlled within a specific range, which can effectively avoid the breakdown of the insulating layer due to too small thickness, and also avoid, in the thickness direction of the current collector, that the insulating layer arches a separator due to too large thickness.

In some embodiments, the porous foam metal part is porous foam copper and the solid metal part is solid copper. In this design, the porous foam metal part and the solid metal part are both made of copper, so the current collector can be better used as a negative current collector.

In a second aspect, the present application provides an electrode plate, including the current collector according to the above embodiments.

In a third aspect, the present application provides an electrode assembly, including a separator and the electrode plates according to the above embodiment, wherein in the thickness direction of the current collector, the separator and the porous foam metal part are distributed as laminated.

In a fourth aspect, the present application provides a battery cell, including a housing and the electrode assembly according to the above embodiment, wherein the electrode assembly is accommodated in the housing.

In a fifth aspect, the present application provides a battery, including a box body and a plurality of battery cells according to the above-mentioned embodiment, wherein the plurality of battery cells are accommodated in the box body.

In a sixth aspect, the present application provides an electric device, including the battery cell according to the above embodiment or the battery according to the above embodiment.

In a seventh aspect, the present application provides a current collector preform, including an alloy part and a solid metal part(s), wherein the alloy part includes a third edge and a fourth edge oppositely distributed in a first direction; the first direction is perpendicular to the thickness direction of the current collector preform; the alloy part is configured to be able to form porous the porous foam metal part by dealloying, and the porous foam metal part is uncompressed; the solid metal part(s) is connected to the third edge and/or the fourth edge; and the solid metal part is configured to not participate in the reaction during the alloying, so that the solid metal part can be retained after the dealloying.

In the technical solution of the embodiment of the present application, the connection between the solid metal part and the alloy part can be conveniently realized by means of rolling, casting, welding, etc.; the alloy part is configured to form the uncompressed porous foam metal part through dealloying, and the solid metal part is configured to be retained after dealloying, so that the current collector of the above embodiment can be obtained by dealloying the current collector preform.

In an eighth aspect, the present application provides a method for manufacturing a current collector, including: providing a current collector preform as mentioned in the above embodiment; and dealloying the current collector preform so that the alloy part forms a porous foam metal part, wherein the solid metal part does not participate in the reaction during the dealloying and is retained.

In the technical solution of the embodiment of the present application, the current collector preform of the above embodiment is provided, and then the dealloying treatment is performed, so that it can conveniently manufacture and obtain the current collector of the above embodiment.

In a ninth aspect, the present application provides equipment for manufacturing a current collector, including a providing device and a dealloying device, wherein the providing device is configured to provide the current collector preform as mentioned in the above embodiment; and the dealloying device is configured to dealloy the current collector preform so that the alloy part forms a porous foam metal part, wherein the solid metal part does not participate in the reaction during the dealloying and is retained.

In the technical solution of the embodiment of the present application, the providing device is provided to provide the current collector preform as mentioned in the above embodiment, and the dealloying device is provided to dealloy the current collector preform, so that the current collector of the above embodiment can be conveniently manufactured and obtained.

The above is only an overview of the technical solution of the present application. In order to better understand the technical means of the present application, it can be implemented according to the contents of the description, and in order to make the above and other purposes, features and advantages of the present application more obvious and understandable, embodiments of the present application are specifically listed below.

BRIEF DESCRIPTION OF DRAWINGS

Various other advantages and benefits will become apparent to the person skilled in the art upon reading the following detailed description of the preferred embodiments. The drawings are only for the purpose of illustrating the preferred embodiments and are not to be considered as limiting the application. Also, same reference numerals are used to indicate same components throughout the drawings. In the drawings.

Figures 1, 2:
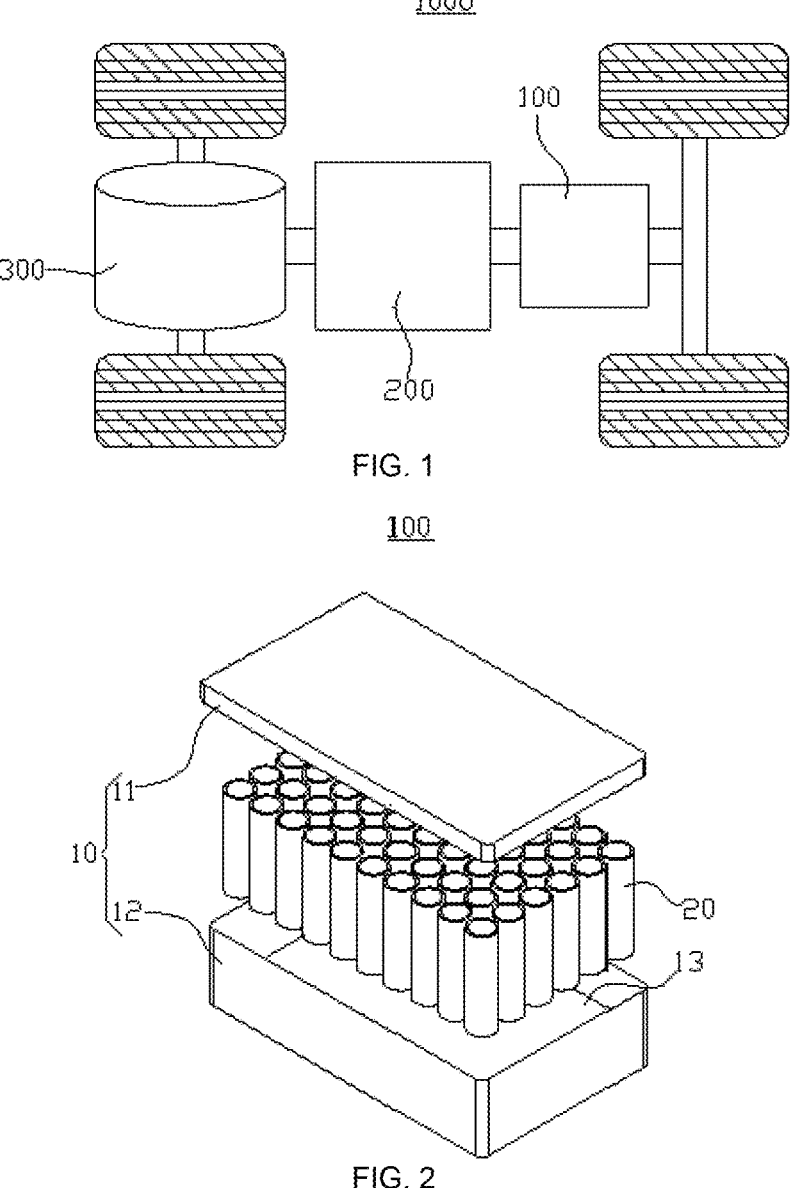
FIG. 1 is a schematic structural view of a vehicle provided in some embodiments of the present application.
FIG. 2 is an exploded view of a battery provided in some embodiments of the present application.

The reference numerals in the embodiments are as follows:

vehicle 1000;

battery 100, controller 200, motor 300;

box body 10, first part 11, second part 12, accommodation space 13;

battery cell 20, housing 21, electrode assembly 22, electrode terminal 23, pressure relief structure 24;

casing 211, cover body 212, sealed space 213, electrode plate 220, negative electrode plate 221, positive electrode plate 222, separator 223;

current collector 2201, current collector preform 2202;

porous foam metal part 22011, first edge 22011*a*, second edge 22011*b*;

solid metal part 22012, first metal segment 22012*a*, second metal segment 22012*b*, third metal segment 22012*c*;

insulating layer 22013;

negative current collector 2211;

positive current collector 2221, positive electrode active material layer 2222;

alloy part 22021, third edge 22021*a*, fourth edge 22021*b*;

equipment 2000 for manufacturing current collector;

providing device 2100, dealloying device 2200;

first direction A, thickness direction B of current collector, thickness direction C of current collector preform.

DETAILED DESCRIPTION OF EMBODIMENTS

Embodiments of the technical solutions of the present application will be described in detail below in conjunction with the drawings. The following embodiments are only used to illustrate the technical solution of the present application more clearly, and therefore are only examples, rather than limiting the protection scope of the present application.

Unless otherwise defined, all technical and scientific terms used herein have the same meanings as commonly understood by those skilled in the technical field of the application; the terms used herein are only for the purpose of describing specific embodiments, and are not intended to limit the present application; and the terms "comprising" and "having" and any variations thereof in the specification and claims of the present application and the description of drawings above are intended to cover a non-exclusive inclusion.

In the description of the embodiments of this application, the technical terms "first", "second", "third" and so on are only used to distinguish different objects, and cannot be understood as indicating or implying importance in relativity or implicitly indicating the quantity, specific order or primary-secondary relationship of indicated technical features.

In the description of the embodiment of the present application, the orientation or positional relationship indicated by the technical terms "thickness", "inner", "outer", etc. is based on the orientation or positional relationship shown in the drawings, and is only for facilitating describing the embodiments of the present application and simplifying the description, rather than indicating or implying that the device or element referred to must have a specific orientation or be constructed and operated in a specific orientation, and therefore should not be construed as limiting the embodiments of the present application.

In the description of the embodiments of this application, unless otherwise clearly specified and defined, technical terms such as "install", "link", "connect" and "fix" should be interpreted in a broad sense. For example, it may be fixed connection or also may be detachable connection or integral connection. It may be direct connection or indirect connection through an intermediary. For those skilled in the art, the specific meanings of the above terms in the embodiments of the present application may be understood according to specific situations.

Reference herein to "embodiment" means that a particular feature, structure, or characteristic described in connection with the embodiment may be included in at least one embodiment of the present application. This phrase occurring in various places in the specification are not necessarily all referring to the same embodiments, nor are separate or alternative embodiments mutually exclusive of other embodiments. It is understood explicitly and implicitly by those skilled in the art that the embodiments described herein may be combined with other embodiments.

In the embodiments of the present application, same reference numerals denote the same components, and for the sake of brevity, detailed description of the same components is omitted in different embodiments. It should be understood that the thickness, length, width and other dimensions of the various components in the embodiments of the application shown in the drawings, as well as the overall thickness, length and width and other dimensions of the integrated device, are for illustrative description only, and should not constitute any limitation to the application.

In the present application, the battery cells may include lithium-ion secondary batteries, lithium-ion primary batteries, lithium-sulfur batteries, sodium-lithium-ion batteries, sodium-ion batteries, or magnesium-ion batteries, which is not limited in the embodiments of the present application. The battery cell may be in the shape of a cylinder, a flat body, a cuboid or in other shape, which is also not limited in this embodiment of the present application. Battery cells are generally divided into three types according to packaging methods: cylindrical battery cells, square battery cells and soft pack battery cells, which is not limited in this embodiment of the present application.

The battery cell includes an electrode assembly and an electrolytic solution, and the electrode assembly is composed of a positive electrode plate, a negative electrode plate and a separator. The battery cell works primarily by moving metal ions between the positive electrode plate and negative electrode plate. The material of the separator may be PP (polypropylene) or PE (polyethylene), etc. The positive electrode plate includes a positive current collector and a positive electrode active material, wherein the positive electrode active material is coated on the surface of the positive current collector and/or filled in the porous positive current collector; the positive current collector includes a positive electrode active material area and a positive electrode tag connected to the positive electrode active material area, the positive electrode active material area is coated with the positive electrode active material layer and/or filled with the positive electrode active material, and the positive electrode tab is not coated and filled with the positive electrode active material. Taking a lithium-ion battery cell as an example, the material of the positive current collector may be aluminum, and the positive electrode active material may be lithium cobaltate, lithium iron phosphate, ternary lithium, or lithium manganate, etc. The negative electrode plate includes a negative current collector and a negative electrode active material, wherein the negative electrode active material is coated on the surface of the negative current collector and/or filled in the porous negative current collector; the negative current collector includes a negative electrode active material area and a negative electrode tag connected to the negative electrode active material area. The negative electrode active material area is coated with the negative electrode active material layer and/or filled with the negative electrode active material, and the negative electrode tab is not coated and filled with the negative electrode active material layer. The material of the negative current collector may be copper, and the negative electrode active material may be carbon or silicon, etc. In addition, the electrode assembly may be in a coiled structure or a laminated structure, which is not limited in the embodiment of the present application.

In the present application, a battery refers to a single physical module that includes one or more battery cells to provide higher voltage and capacity. For example, the battery mentioned in the present application may include a battery module or a battery pack, and the like. The battery generally includes a box body for packaging one or more battery cells. The box body may prevent a liquid or other foreign object from affecting the charging or discharging of the battery cells.

At present, from the perspective of the development of the market situation, the application of power batteries is becoming more and more extensive. Power batteries are not only used in energy storage power source systems such as hydraulic, thermal, wind and solar power plants, but also widely used in electric means of transport such as electric bicycles, electric motorcycles, electric vehicles, as well as fields of military equipment and aerospace, etc. With the continuous expansion of power battery application fields, its market demand is also constantly increasing.

The applicant noticed that in some existing electrode plate designs, porous current collectors are used. In order to reserve enough space for the porous current collector to deposit metal lithium or fill active materials, etc., and at the same time, in order to reduce the amount of metal used, foam metal with high porosity (for example $\geq 70\%$) is usually selected, which makes the current collector in the form of foam metal leak laser light during laser welding, resulting in occurrence of the phenomenon of scalding the electrode assembly, failing to form a molten pool, and easily forming an explosion point, and thus making it difficult for the current collector in the form of foam metal to be connected to the housing by means of laser welding.

In order to alleviate the technical problem that the current collector in the form of foam metal is difficult to be connected to the housing by means of laser welding, the present proposed technical solution usually includes compressing the edge of the current collector to form a compressed area, and then welding, in the compressed area, a solid metal as an electrode tab. However, in the present solution proposed above, due to that the edge of the current collector is compressed, the porosity of the compressed area is reduced, which may reduce the overall thickness, porosity and pore distribution uniformity of the foam metal; and further, during lithium deposition operation, etc., lithium metal will be easily deposited on the surface of the compressed area, which may easily lead to increase of the local expansion force.

Based on the above considerations, the applicant has designed a current collector preform after in-depth researches. The current collector preform includes an alloy part and a solid metal part connected to the edge of the alloy part. By dealloying the current collector preform, the current collector in which the solid metal is directly connected to the edge of the foam metal is obtained. The edge of the current collector is connected with the solid metal, which can alleviate the problem that the current collector in the form of foam meal is difficult to be connected to the housing by laser welding; and the edge of the foam metal is not compressed, which can further avoid reducing of the overall thickness, porosity and pore distribution uniformity of the foam metal due to compression.

The technical solutions described in the embodiments of the present application are applicable to a current collector, an electrode plate using the current collector, an electrode assembly using the electrode plate, a battery cell using the electrode assembly, a battery using the battery cell, an electric device using the battery cell, and the manufacturing method and equipment of the current collector. In the above, the current collector may be a positive current collector or a negative current collector.

In the present application, the electric equipment may be in various forms, for example, a mobile phone, a portable device, a laptop, a battery car, an electric vehicle, a ship, a spacecraft, an electric toy and an electric tool, etc. For example, the spacecraft includes airplane, rocket, space shuttle and spaceship, etc. The electric toy includes fixed or mobile electric toy, such as game console, electric car toy, electric ship toy and electric airplane toy, etc. The electric tool includes metal cutting electric tool, grinding electric tool, assembly electric tool and railway electric tool, for example, electric drill, electric grinder, electric wrench, electric screwdriver, electric hammer, impact electric drill, concrete vibrator and electric planer.

In the following embodiments, for convenience of description, description is made by taking an electric device according to an embodiment of the present application being a vehicle.

Referring to FIG. 1, FIG. 1 is a schematic structural view of a vehicle 1000 provided in some embodiments of the present application. The vehicle 1000 may be a fuel vehicle, a gas vehicle or a new energy vehicle, and the new energy vehicle may be a pure electric vehicle, a hybrid power vehicle or an extended-range vehicle, etc. A battery 100 is provided inside the vehicle 1000, and the battery 100 may be provided at the bottom, head or tail of the vehicle 1000. The battery 100 may be used for supplying power to the vehicle 1000. For example, the battery 100 may be used as an operating power source of the vehicle 1000. The vehicle 1000 may further include a controller 200 and a motor 300, the controller 200 being used to control the battery 100 to supply power to the motor 300, for example, for working power requirements during starting, navigating and running of the vehicle 1000.

In some embodiments of the present application, the battery 100 can not only be used as an operating power source for the vehicle 1000, but also be used as a driving power source for the vehicle 1000 to replace or partially replace fuel oil or natural gas to provide driving power for the vehicle 1000.

Referring to FIG. 2, FIG. 2 is an exploded view of a battery 100 provided in some embodiments of the present application. The battery 100 may include a box body 10 and battery cells 20, and the battery cells 20 are accommodated in the box body 10. In the above, the box body 10 is used for accommodating the battery cells 20, and the box body 10 may be in various structures. In some embodiments, the box body 10 may include a first part 11 and a second part 12, the first part 11 and the second part 12 cover each other, and the first part 11 and the second part 12 together define an accommodation space 13 for accommodating the battery cells 20. The second part 12 may be in a hollow structure with one end open, the first part 11 is in a plate-shaped structure, and the first part 11 covers the opening side of the second part 12 to form the box body 10 with the accommodation space 13. The first part 11 and the second part 12 may also each be in a hollow structure with one side open, and the opening side of the first part 11 covers the opening side of the second part 12 to form the box body 10 with the accommodating space 13. Of course, the first part 11 and the second part 12 may be in various shapes, such as a cylinder, a cuboid and so on.

In the battery 100, there may be one or multiple battery cells 20. If there are multiple battery cells 20, the multiple battery cells 20 may be in serial, parallel or hybrid connection with each other. The hybrid connection means that the multiple battery cells 20 are connected with each other both in series and in parallel. The multiple battery cells 20 can be directly in serial, in parallel or in hybrid connection with each other, and then the whole composed of the multiple battery cells 20 is accommodated in the box body 10. It is also possible that the multiple battery cells 20 are first in serial or in parallel or in hybrid connection with each other to form battery 100 modules, and then the multiple battery 100 modules are in serial or in parallel or in hybrid connection with each other to form a whole, and accommodated in the box body 10. The battery 100 may also include other structures, for example, the multiple battery cells 20 may be electrically connected with each other through a bus component, so as to realize parallel connection, serial connection or hybrid connection of multiple battery cells 20.

In the above, each battery cell 20 may be a secondary battery 100 or a primary battery 100. It may also be a lithium-sulfur battery 100, a sodium-ion battery 100 or a magnesium-ion battery 100, but is not limited thereto. The battery cell 20 may be in the shape of a cylinder, a flat body, a cuboid or in other shape, etc.

Figure 3:
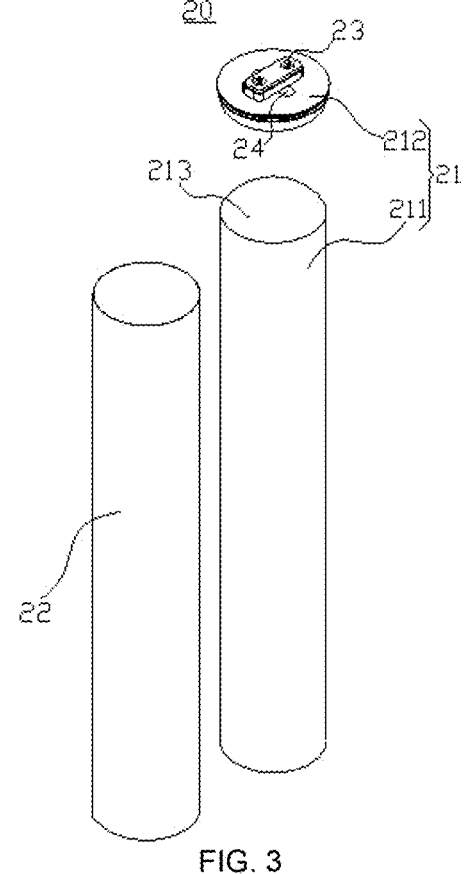
FIG. 3 is an exploded view of the battery cell shown in FIG. 2.

Referring to FIG. 3, FIG. 3 is an exploded view of the battery cell 20 shown in FIG. 2. The battery cell 20 refers to the smallest unit constituting the battery 100. The battery cell 20 may include a housing 21 and an electrode assembly 22, with the electrode assembly 22 accommodated in the housing 21. In some embodiments, the housing 21 may also be used to accommodate an electrolyte, such as electrolytic solution. The housing 21 may be in various structural forms.

The housing 21 may include a casing 211 and a cover body 212.

The casing 211 is an assembly for cooperating with the cover body 212 to form an internal sealed space 213 of the battery cell 20, wherein the formed sealed space 213 may be used to accommodate the electrode assembly 22, electrolytic solution and other components. The casing 211 and the cover body 212 may be independent components, and the casing may be provided with an opening, wherein the internal environment of the battery cell 20 may be formed by making the cover body 212 cover the opening at the opening. Without limitation, the cover body 212 and the casing 211 may also be integral. Specifically, the cover body 212 and the casing 211 may form a common connecting surface before other components enter the casing, and when needing to package the inside of the casing 211, the cover body 212 is made to cover the casing 211. The casing 211 may be in various shapes and various sizes, such as cuboid, cylinder, hexagonal prism and so on. Specifically, the shape of the casing 211 may be determined according to the specific shape and size of the electrode assembly 22. The casing 211 may be made of various materials, such as copper, iron, aluminum, stainless steel, aluminum alloy, plastic, etc., which is not specially limited in this embodiment of the present application.

The cover body 212 refers to a component that covers the opening of the casing 211 to isolate the internal environment of the battery cell 20 from the external environment. Without limitation, the shape of the cover body 212 may be adapted to the shape of the casing 211 to cooperate with the casing 211. In some embodiments, the cover body 212 may be made of a material with certain hardness and strength (such as aluminum alloy), so that the cover body 212 is not easy to be deformed when being pressed and collided, enabling that the battery cell 20 has higher structural strength and also improved safety performance. The material of the cover body 212 may also be other material, such as copper, iron, aluminum, stainless steel, aluminum alloy, plastic, etc., which is not specially limited in this embodiment of the present application. In some embodiments, the inner side of the cover body 212 may be provided with an insulation member, and the insulation member may be used to isolate the electrical connection components in the casing 211 from the cover body 212 to reduce the risk of short circuit. Exemplarily, the insulation member may be plastic, rubber or the like.

The cover body 212 may be provided thereon with functional components such as electrode terminal 23. The electrode terminal 23 is mounted on the cover body 212. The electrode terminal 23 is electrically connected with the electrode assembly 22 to output the electric energy generated by the battery cell 20. Exemplarily, the electrode terminal 23 may be electrically connected with the electrode assembly 22 through an adapter plate (not shown in the figures).

The battery cell 20 may further include a pressure relief structure 24, wherein the pressure relief structure 24 is used for releasing the pressure inside the battery cell 20 when the internal pressure or temperature of the battery cell 20 reaches a predetermined value. Exemplarily, the pressure relief structure 24 may be a component such as an explosion-proof valve, a burst disk, a gas valve, a pressure relief valve, or a safety valve, etc.

When assembling the battery cell 20, the electrode assembly 22 may be placed inside the casing 211 first, and electrolyte is filled into the casing 211, and then the cover body 212 covers the opening of the casing 211.

Figure 4:
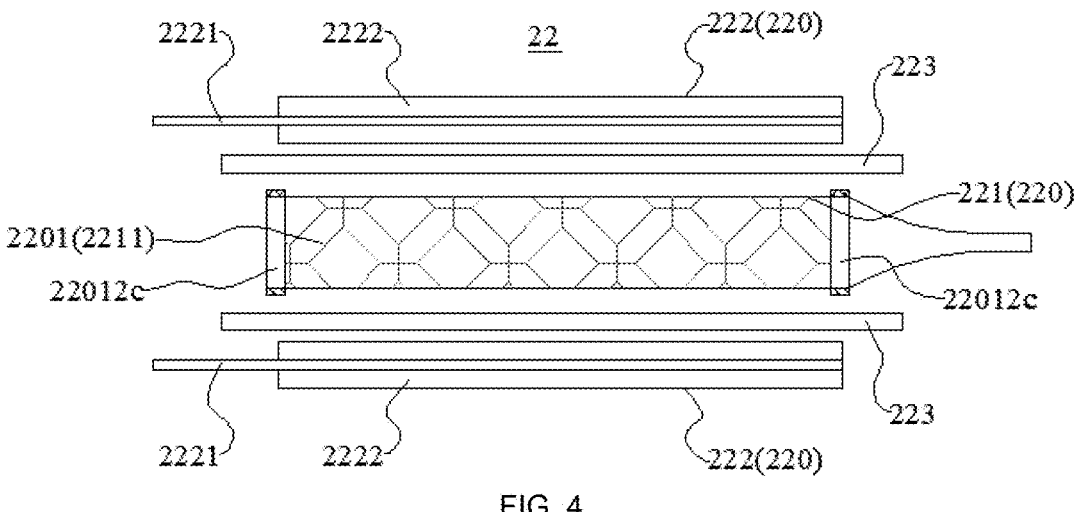
FIG. 4 is a schematic structural view of an electrode assembly provided in some embodiments of the present application.

Referring to FIG. 4, FIG. 4 is a schematic structural view of an electrode assembly 22 provided in some embodiments of the present application. The electrode assembly 22 is a component, in the battery cell 20, where electrochemical reactions occur. The casing 211 may contain one or more electrode assemblies 22. The electrode assembly 22 is mainly formed by winding or stacking the electrode plates 220 and the separator 223. In the above, the electrode plates 220 include a positive electrode plate 222 and a negative electrode plate 221 located at two sides of the separator 223. The electrode plate 220 includes a current collector 2201, the current collector 2201 in the negative electrode plate 221 is a negative current collector 2211, and the current collector 2201 in the positive electrode plate 222 is a positive current collector 2221. As an example, the positive current collector 2221 is an aluminum foil, and the surface of the positive current collector 2221 is coated with a positive active material layer 2222; the negative current collector 2211 is mainly porous foam copper, the pores of the negative current collector 2211 are used to deposit lithium, and the two side surfaces of the negative current collector 2211 may not be coated with negative active material.

Next, the specific structure of the current collector 2201 will be described in detail with reference to the drawings.

In the first aspect, according to some embodiments of the present application, referring to FIG. 5 to FIG. 9, the present application provides a current collector 2201, including a porous foam metal part 22011 and a solid metal part 22012; the porous foam metal part 22011 is uncompressed, and the porous foam metal part 22011 includes a first edge 22011*a* and a second edge 22011*b* oppositely distributed in a first direction A; the first direction A is perpendicular to the thickness direction B of the current collector; and the first edge 22011*a* and/or the second edge 22011*b* are connected with a solid metal segment 22012.

The current collector 2201 may be a positive current collector 2221, or the current collector 2201 may also be a negative current collector 2211. When the current collector 2201 is the positive current collector 2221, the porous foam metal part 22011 and the solid metal part 22012 may use materials suitable for the positive electrode plate 222, for example, porous foam aluminum and solid aluminum respectively. When the current collector 2201 is the negative current collector 2211, the porous foam metal part 22011 and the solid metal part 22012 may use materials suitable for the negative electrode plate 221, for example, porous foam aluminum copper and solid copper, respectively.

The porous foam metal part 22011 refers to a layered metal porous body having pores, wherein the porosity thereof is optionally 20-95%, further optionally 60-95%.

That the porous foam metal part 22011 is uncompressed means that the porous foam metal part 22011 is porous foam metal part 22011 obtained directly after the process of removing the pore-forming agent. It is not subjected to compressing after the process of removing the pore-forming agent. In other words, in the uncompressed porous foam metal part 22011, in the first direction A, the thicknesses of every parts of the porous foam metal part 22011 are basically same, and the possible difference in thickness mainly comes from the unavoidable deviation in the manufacturing process. In the uncompressed porous foam metal part 22011, the porosities of every parts of the porous foam metal part 22011 are basically same, and the possible difference in porosity mainly comes from the unavoidable deviation in the manufacturing process.

The solid metal part 22012 refers to the solid metal obtained by casting and other processes, wherein the inside of the solid metal basically has no pores, and the possible pores mainly come from the inevitable bubbles in the manufacturing process.

The first direction A may refer to the length direction of the current collector 2201, or may refer to the width direction of the current collector 2201.

The solid metal part 22012 is connected to the edge of the porous foam metal part 22011 in a fixed connection manner, for example, but not limited to, casting connection, rolling connection, welding and the like.

It has been found through researches that, under the welding connection manner, on the one hand, thickness differences are likely to occur in the welding area, and when the current collector 2201 is applied to the electrode assembly 22, stress concentration may occur in the thicker welding area, resulting in overlarge local expansion force, which may affect the cycle life and safety of the electrode assembly 22; and on the other hand, welding generally causes high temperature, which may cause the metal in the welding area to be oxidized, further affect the stability of the oxidized area in the electrolytic solution and cause the risk of electrolytic solution corroding the welding area, wherein the welding area is where the current passes, and if excessive corrosion occurs, the resistance increases and generated heat increases, which may also lead to safety problems of the electrode assembly 22, such as thermal runaway. As an example, the solid metal part 22012 and the porous foam metal part 22011 are connected with each other by means of rolling, so that the solid metal part 22012 and the porous foam metal part 22011 are in a state of being integrally connected with each other, and this connection manner may effectively avoid the above-mentioned problems existing in the welding manner.

Figure 5:
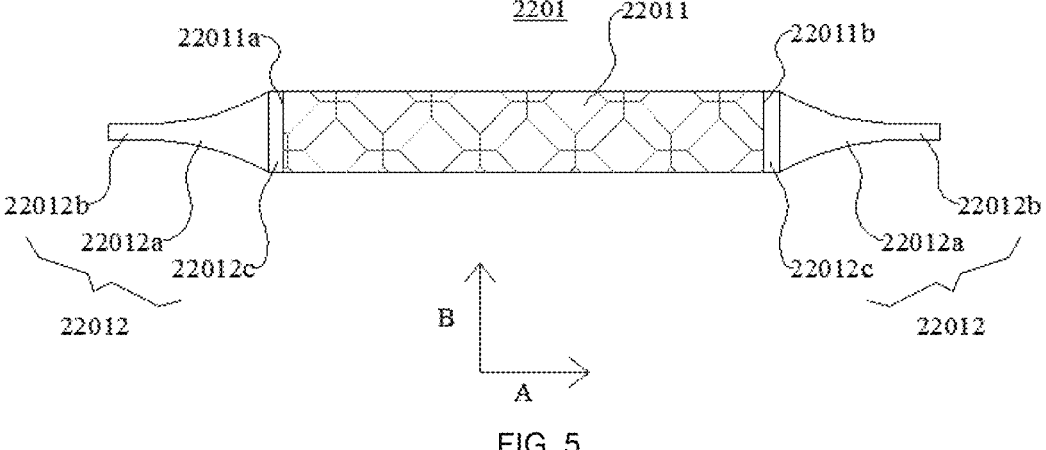
FIG. 5 is a schematic structural side view of the current collector of a first design provided in some embodiments of the present application.
Figure 6:
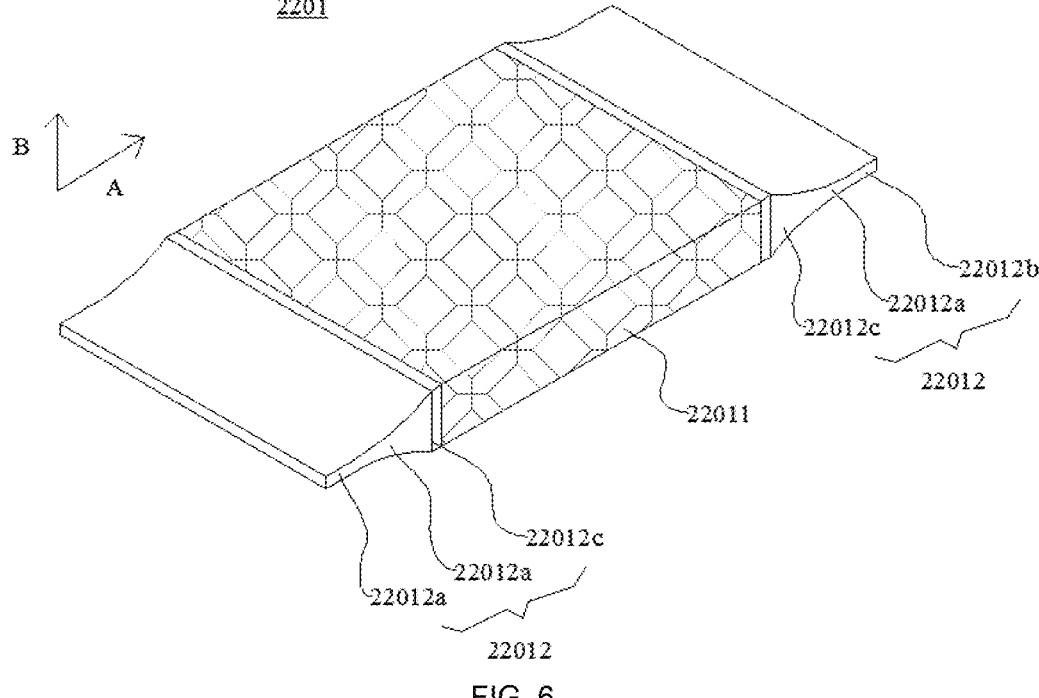
FIG. 6 is an axonometric view of the current collector of the first design provided in some embodiments of the present application.
Figures 7, 8:
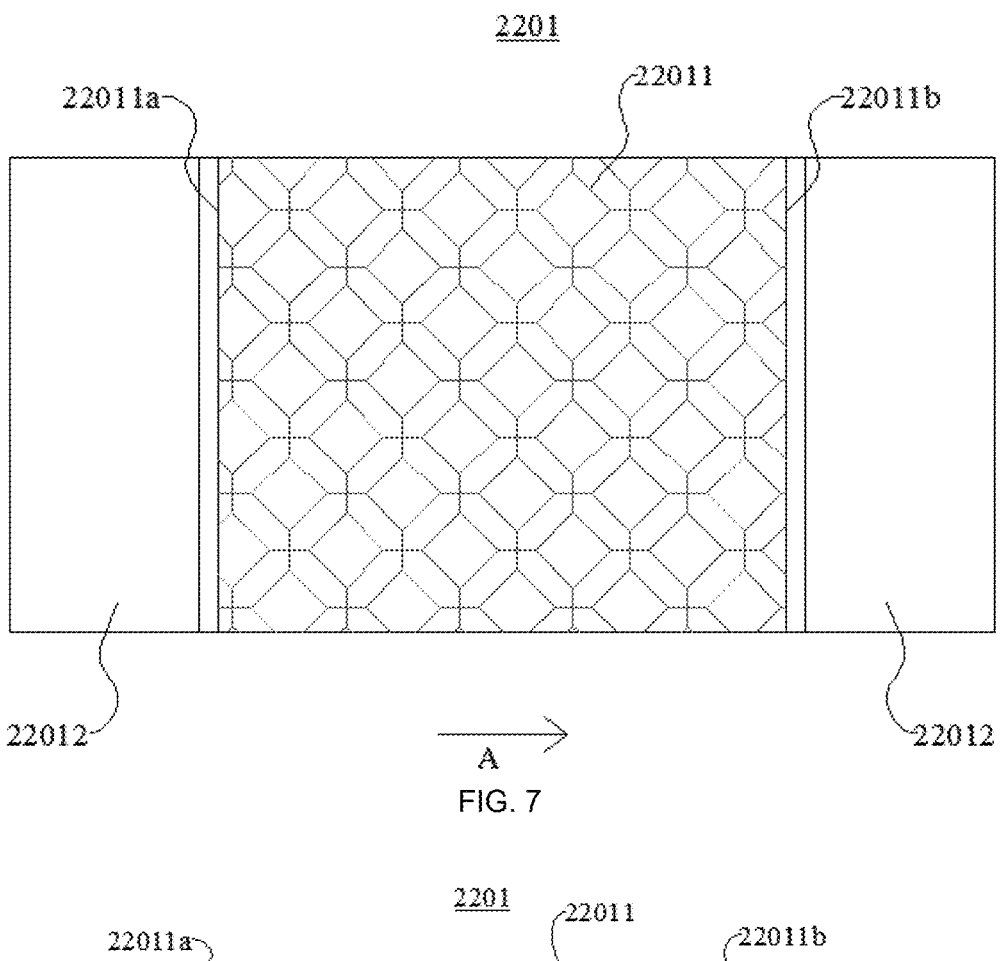
FIG. 7 is a schematic structural top view of the current collector of the first design provided in some embodiments of the present application.
FIG. 8 is a schematic structural side view of the current collector of a second design provided in some embodiments of the present application.
Figure 9:
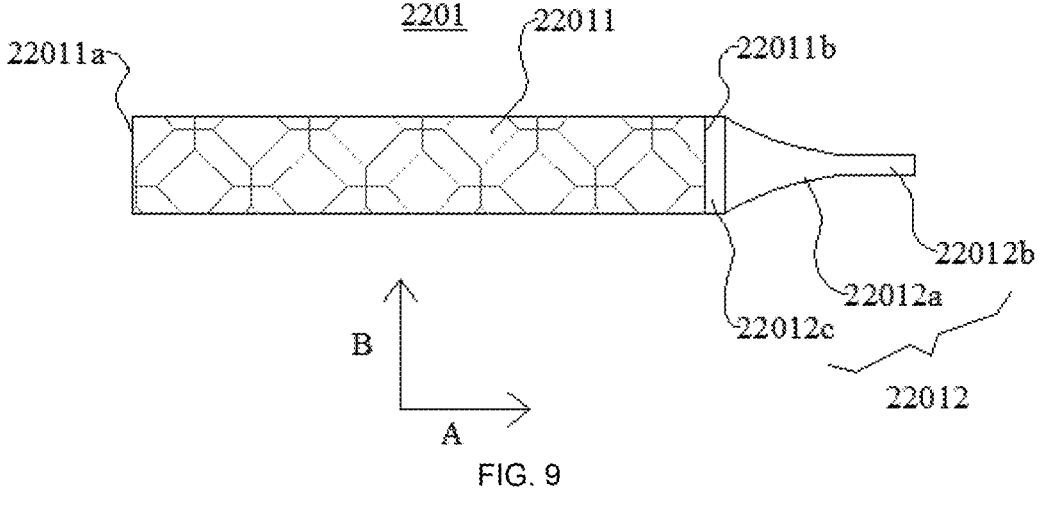
FIG. 9 is a schematic structural side view of the current collector of a third design provided in some embodiments of the present application.

That the first edge 22011*a* and/or the second edge 22011*b* is connected with the solid metal part 22012 includes the following situations. In the first situation, referring to FIG. 9, only one of the first edge 22011*a* and the second edge 22011*b* is connected with a solid metal part 22012. In the second situation, referring to FIG. 5 to FIG. 8, the first edge 22011*a* and the second edge 22011*b* are respectively provided with a solid metal part 22012. In the second situation, the solid metal parts 22012 provided on the first edge 22011*a* and the second edge 22011*b* may be same (as shown in FIG. 5 to FIG. 7) or different (as shown in FIG. 8). A current collector 2201 may be provide in an electrode plate 220, and at this time, the electrode plate 220 may be provided in the form of the tab being led out from a single side or the tab being led out from two sides; and in the first direction A, one current collector 2201 may be cut, in the middle, into two current collector 2201, wherein each current collector 2201 after the cutting is connected therein with one solid metal part 22012, and has a structure as shown in FIG. 9.

In the technical solution of the embodiment of the present application, the edge of the porous foam metal part 22011 is connected to the solid metal part 22012, with the solid metal part 22012 used as the welding area of the current collector 2201. When performing laser welding, the solid metal part 22012 can effectively prevent laser leakage, further effectively avoid occurrence of the phenomenon of scalding the electrode assembly 22, failing to form a molten pool, and easily forming an explosion point, and thereby alleviate the problem that the current collector 2201 in the form of foam metal is difficult to be connected to the housing 21 by laser welding. The edge of the porous foam metal part 22011 is uncompressed, which can further avoid reducing of the overall thickness, porosity and pore distribution uniformity of the porous foam metal part 22011 due to compression.

In some embodiments, according to the first aspect, a first example of the first aspect is proposed, wherein the thickness of the solid metal part 22012 is smaller than or equal to the thickness of the porous foam metal part 22011.

The thickness of the solid metal part 22012 refers to the size of the solid metal part 22012 in the thickness direction B of the current collector, and the thickness of the porous foam metal part 22011 refers to the size of the porous foam metal part 22011 in the thickness direction B of the current collector. In the embodiment of the present application, the thickness of each part of the current collector 2201 refers to the size in the thickness direction B of the current collector, unless otherwise specified.

The thickness of the porous foam metal part 22011 may be selected according to the design of the electrode assembly 22. As an example, the thickness of the porous foam metal part 22011 is 50 μm~400 μm, for example, but not limited to any point value or a range value between any two of 50 μm, 100 μm, 150 μm, 200 μm, 250 μm, 300 μm, 350 μm and 400 μm. If the thickness of the porous foam metal part 22011 is too large, the ion transmission distance become longer, affecting the impedance of the battery 100; and if the thickness of the porous foam metal part 22011 is too small, it is inconvenient to manufacture.

In the first direction A, the thicknesses of every parts of the solid metal part 22012 may be same or different. In the first direction A, in the first situation, the thickness of a part of the solid metal part 22012 is smaller than the thickness of the porous foam metal part 22011, and the thickness of the other part is equal to the thickness of the porous foam metal part 22011; in the second situation, the thickness of each part of the solid metal part 22012 is smaller than the thickness of the porous foam metal part 22011; and in the third situation, the thickness of each part of the solid metal part 22012 is equal to the thickness of the porous foam metal part 22011.

In this design, the thickness of the solid metal part 22012 is configured to not exceed the thickness of the porous foam metal part 22011, so in the thickness direction B of the current collector, the solid metal part 22012 is prevented from exceeding the porous foam metal part 22011, thereby preventing the solid metal part 22012 from arching the separator 223, and ensuring that the porous foam metal part 22011 can be better attached to the separator 223.

In some embodiments, according to the first example of the first aspect, a second example of the first aspect is proposed, wherein for the solid metal part 22012 connected with the first edge 22011*a* and/or the second edge 22011*b*, in the first direction A, the thickness of the end of the solid metal part 22012 away from the porous foam metal part 22011 is smaller than the thickness of the end of the solid metal part 22012 close to the porous foam metal part 22011.

The solid metal part 22012 connected with the first edge 22011*a* and/or the second edge 22011*b* is provided according to the above-mentioned standard, including the following situations. In the first situation, referring to FIG. 9, only one of the first edge 22011*a* and the second edge 22011*b* is connected with a solid metal part 22012, at this time, there is only one solid metal part 22012 in the current collector 2201, and the solid metal part 22012 is provided according to the above standard. In the second situation, referring to FIG. 5 to FIG. 8, the first edge 22011*a* and the second edge 22011*b* are respectively provided with a solid metal part 22012, at this time, there are only two solid metal parts 22012 in the current collector 2201, and at least one of the solid metal parts 22012 is provided according to the above standard, wherein when the two solid metal parts 22012 are both provided according to the above standard, they are as shown in FIG. 5 to FIG. 7, and when one of the solid metal parts 22012 is provided according to the above standard, they are as shown in FIG. 8.

There is no limit to the manner of providing the solid metal part 22012 to have thickness difference in the first direction A, for example, it may be implemented in a manner of gently and gradually changing, or may be implemented in a manner of suddenly changing.

The end of the solid metal part 22012 away from the porous foam metal part 22011 is used for laser welding. As an example, its thickness is 4.5 μm~8 μm, for example, but not limited to any point value or a range value between any two of 4.5 μm, 5 μm, 5.5 μm, 6 μm, 6.5 μm, 7 μm, 7.5 μm, and 8 μm. The end of the solid metal part 22012 away from the porous foam metal part 22011 is used for allowing the tab to be led out, and the tab is used for allowing current to pass therethrough, wherein if the thickness thereof is too large, the current passing amount is too large, and if the thickness thereof is too small, the current passing capability is poor.

In this design, the solid metal part 22012 is provided in such a way that the thickness of the end away from the porous foam metal part 22011 is smaller than the thickness of the end close to the porous foam metal part 22011. The thickness of the end of the solid metal part 22012 close to the porous foam metal part 22011 is relatively larger, which is beneficial for the solid metal part 22012 to be connected to the porous foam metal part 22011 more stably, and the thickness of the end of the solid metal part 22012 away from the porous foam metal part 22011 is relatively smaller, which is convenient for performing cutting and laser welding operations.

In some embodiments, according to the second example of the first aspect, a third example of the first aspect is proposed, wherein the solid metal part 22012 has a first metal segment 22012*a*; and in the first direction A, the thickness of the first metal segment 22012*a* gradually decreases from the end close to the porous foam metal part 22011 to the end away from the porous foam metal part 22011.

Figure 10:
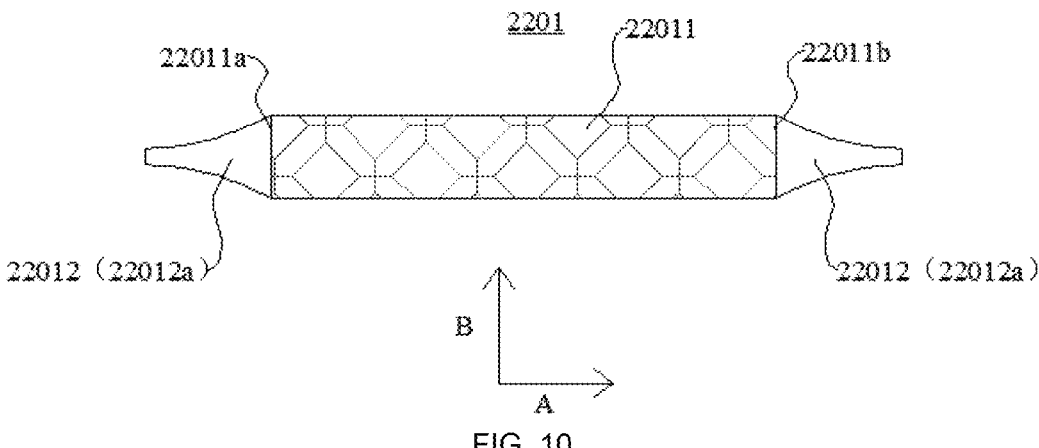
FIG. 10 is a schematic structural side view of the current collector of a fourth design provided in some embodiments of the present application.

In the embodiment in which the first metal segment 22012*a* is provided, as an example, the solid metal part 22012 is composed of the first metal segment 22012*a*, as shown in FIG. 10. In other embodiments, in the first direction A, other metal segment may also be provided on at least one end of the first metal segment 22012*a*.

Figure 11:
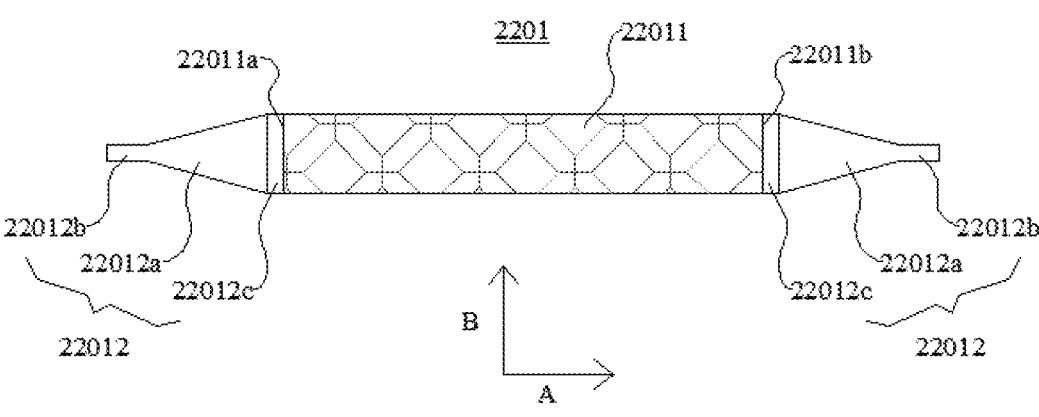
FIG. 11 is a schematic structural side view of the current collector of a fifth design provided in some embodiments of the present application.

There is no limit to the manner in which the solid metal part 22012 is provided to gradually change in thickness in the first direction A, and the gradient line corresponding to the thickness change thereof may be arc-shaped (as shown in FIG. 5) or linear (as shown in FIG. 11).

In this design, in order to make the solid metal part 22012 provided in such a way that the thickness of the end away from the porous foam metal part 22011 is relatively smaller, a first metal segment 22012*a* having a thickness gradually decreased in the direction away from the porous foam metal part 22011 is provided in the solid metal part 22012, and through the smooth transition of the first metal segment 22012*a*, the surface of the solid metal part 22012 is made to be smooth and easy to form.

Referring to FIG. 5, in some embodiments, according to the third example of the first aspect, a fourth example of the first aspect is proposed, wherein the surface of the first metal segment 22012*a* distributed in the thickness direction B of the current collector is an arc-shaped surface; and in the thickness direction B of the current collector, the arc-shaped surface bends toward the thickness center of the current collector 2201.

The thickness center of the current collector 2201 is located at ½ of the thickness of the current collector 2201, that is to say, the arc-shaped surface bends inward toward the middle of the current collector 2201.

In this design, the first metal segment 22012*a* is provided in the form of arc transition, and the first metal segment 22012*a* is conveniently realized by pressing, so that the forming of the solid metal part 22012 is more convenient.

Referring to FIG. 5, in some embodiments, according to the third example of the first aspect, a fifth example of the first aspect is proposed, wherein the solid metal part 22012 has a second metal segment 22012*b*; in the first direction A, the second metal segment 22012*b* is connected to the end of the first metal segment 22012*a* away from the porous foam metal part 22011; and the thickness of the second metal segment 22012*b* is equal to the thickness of the end of the first metal segment 22012*a* away from the porous foam metal part 22011.

The thickness of the second metal segment 22012*b* is equal to the thickness of the end of the first metal segment 22012*a* away from the porous foam metal part 22011, that is to say, in the first direction A, the thicknesses of every parts of the second metal segment 22012*b* are same; and at the same time, the outer edge of the second metal segment 22012*b* is connected to the outer edge of the end of the first metal segment 22012*a* away from the porous foam metal part 22011.

The thickness range of the second metal segment 22012*b* is exemplarily 4.5 μm~8 μm.

In one example, the thickness of the porous foam metal part 22011 is 100 μm, and the thickness of the second metal segment 22012*b* is 6 μm.

In one example, the thickness of the porous foam metal part 22011 is 260 μm, and the thickness of the second metal segment 22012*b* is 8 μm.

In this design, the end of the first metal segment 22012*a* away from the porous foam metal part 22011 is provided with the second metal segment 22012*b*, the thickness of the second metal segment 22012*b* is equal to the thickness of the end of the first metal segment 22012*a* away from the porous foam metal part 22011, the connection between the second metal segment 22012*b* and the first metal segment 22012*a* is smooth and stable, and it is convenient to form the solid metal part 22012 having the second metal segment 22012*b* and the first metal segment 22012*a* directly by pressing; and the second metal segment 22012*b* can also be used for providing more operation positions for implementing cutting and laser welding operations, making it more convenient to implement the cutting and laser welding operations.

In some embodiments, according to the third example of the first aspect, a sixth example of the first aspect is proposed, wherein the solid metal part 22012 has a third metal segment 22012*c*; and in the first direction A, the third metal segment 22012*c* is connected between the porous foam metal part 22011 and the first metal segment 22012*a*, with thickness of the third metal segment 22012*c*=(0.95~1)× thickness of the porous foam metal part 22011.

In some embodiments, according to the fifth example of the first aspect, a seventh example of the first aspect is proposed, wherein the solid metal part has a third metal segment; and in the first direction, the third metal segment is connected between the porous foam metal part and the first metal segment, with thickness of the third metal segment=(0.95~1)×thickness of the porous foam metal part.

As an example, in the first direction A, the thicknesses of every parts of the third metal segment 22012*c* are same, wherein the ratio of the thickness of the third metal segment 22012*c* to the thickness of the porous foam metal part 22011 is, for example but not limited to, any point value or a range value between any two of 0.95, 0.96, 0.97, 0.98, 0.99 and 1.

In the electrode assembly 22 shown in FIG. 4, the third metal segment 22012*c* is provided on the negative current collector 2211, and in the thickness direction B of the current collector, the orthographic projection of the third metal segment 22012*c* at least partially overlaps with the positive electrode active material layer 2222, and as an example, the edge of the positive electrode active material layer 2222 is located within the orthographic projection of the third metal segment 22012*c*, so that the third metal segment 22012*c* can better support the positive electrode active material layer 2222.

In this design, the third metal segment 22012*c* is provided between the foam metal and the first metal segment 22012*a*, the thickness of the third metal segment 22012*c* is basically the same as the thickness of the porous foam metal part 22011, and in the thickness direction B of the current collector, the third metal segment 22012*c* has better supporting ability, which can effectively avoid the pressure deformation of the porous foam metal part 22011 due to that the current collector 2201 is pressed.

In some embodiments, according to the sixth example or the seventh example of the first aspect, an eighth example of the first aspect is proposed, wherein the thickness of the third metal segment 22012c is equal to the thickness of the end of the first metal segment 22012a close to the porous foam metal part 22011.

The thickness of the third metal segment 22012c is equal to the thickness of the end of the first metal segment 22012a close to the porous foam metal part 22011, that is to say, in the first direction A, the thicknesses of every parts of the third metal segment 22012c are same; and at the same time, the outer edge of the third metal segment 22012c is connected to the outer edge of the end of the first metal segment 22012a close to the porous foam metal part 22011.

In this design, the thickness of the end of the first metal segment 22012a close to the porous foam metal part 22011 is equal to the thickness of the third metal segment 22012c, the connection between the third metal segment 22012c and the first metal segment 22012a is smooth and stable, and it is convenient to form, directly by means of pressing, the solid metal part 22012 having the third metal segment 22012c and the first metal segment 22012a.

In some embodiments, according to the first example of the first aspect, a ninth example of the first aspect is proposed, wherein the solid metal part 22012 has a third metal segment 22012c, with thickness of the third metal segment 22012c=(0.95~1)×thickness of the porous foam metal part 22011.

In the above embodiment, reference made to the first example of the first aspect means that at least a part of the solid metal part 22012 may be composed of only the third metal segment 22012c.

As shown in FIG. 8, for the two solid metal parts 22012 of the current collector 2201, one solid metal part 22012 is composed of the third metal segment 22012c, the first metal segment 22012a and the second metal segment 22012b, and one solid metal part 22012 is composed of the third metal segment 22012c.

In this design, the third metal segment 22012c is provided in the solid metal part 22012, and the thickness of the third metal segment 22012c is basically the same as the thickness of the porous foam metal part 22011. In the thickness direction B of the current collector, the third metal segment 22012c has better supporting ability, which can effectively avoid the pressure deformation of the porous foam metal part 22011 due to that the current collector 2201 is pressed.

Regarding the distribution manner of the solid metal parts 22012 in the current collector 2201 and the providing manner of the metal segments in the solid metal parts 22012, some examples will be given below.

Referring to FIG. 5, in one example, the first edge 22011a and the second edge 22011b are respectively provided with a solid metal part 22012, and each solid metal part 22012 is composed of a first metal segment 22012a, a second metal segment 22012b and a third metal segment 22012c.

Referring to FIG. 8, in one example, the first edge 22011a and the second edge 22011b are respectively provided with a solid metal part 22012, wherein one solid metal part 22012 is composed of the first metal segment 22012a, the second metal segment 22012b and the third metal segment 22012c, and the other solid metal part 22012 is composed of the third metal segment 22012c.

Referring to FIG. 10, in one example, the first edge 22011a and the second edge 22011b are respectively provided with a solid metal part 22012, and each solid metal part 22012 is composed of the first metal segment 22012a.

Figures 12, 13, 14:
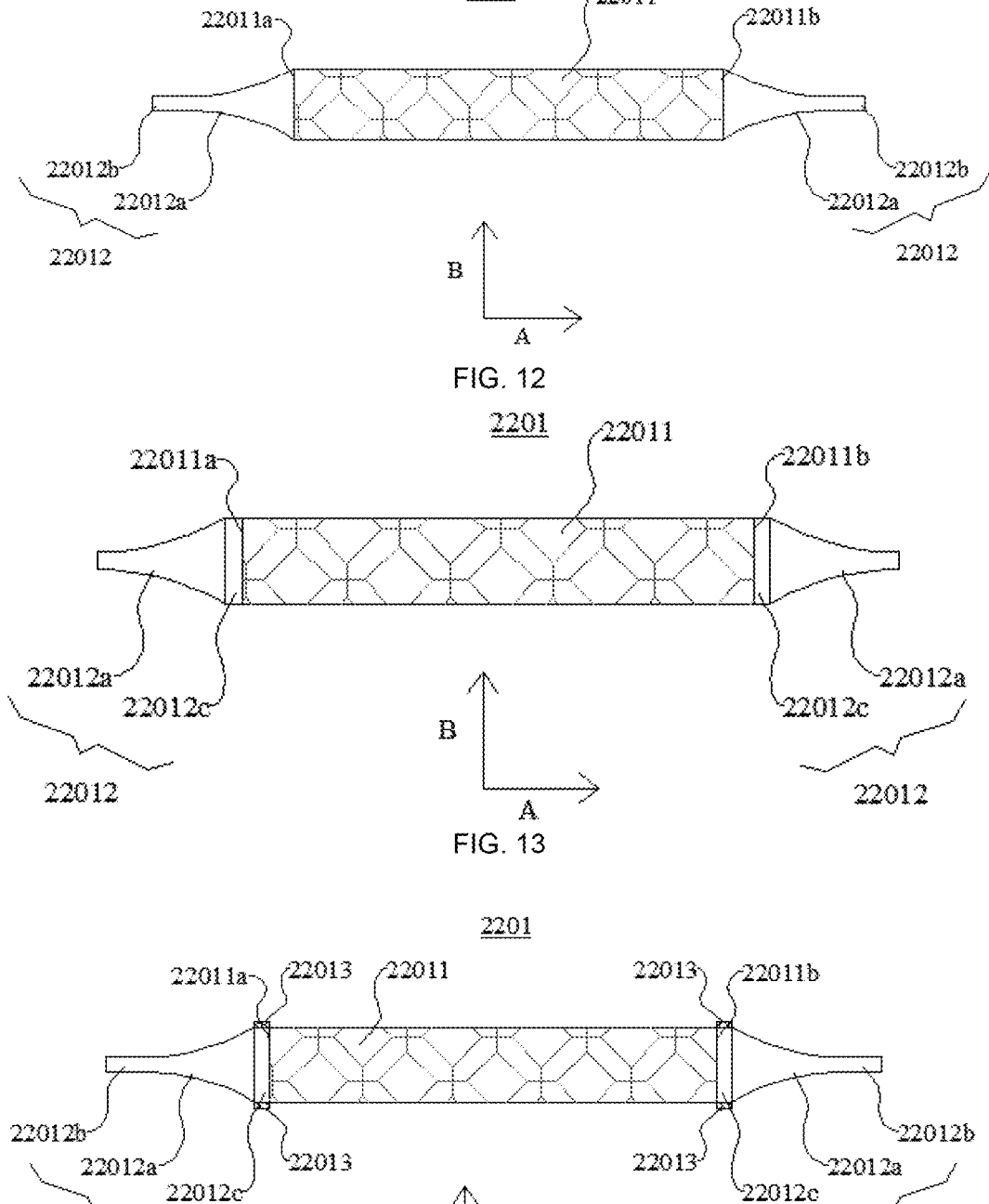
FIG. 12 is a schematic structural side view of the current collector of a sixth design provided in some embodiments of the present application.
FIG. 13 is a schematic structural side view of the current collector of a seventh design provided in some embodiments of the present application.
FIG. 14 is a schematic structural side view of the current collector of an eighth design provided in some embodiments of the present application.

Referring to FIG. 12, in one example, the first edge 22011a and the second edge 22011b are respectively provided with a solid metal part 22012, and each solid metal part 22012 is composed of the first metal segment 22012a and the second metal segment 22012b.

Referring to FIG. 13, in one example, the first edge 22011a and the second edge 22011b are respectively provided with a solid metal part 22012, and each solid metal part 22012 is composed of the first metal segment 22012a and the third metal segment 22012c.

Figures 15, 16:
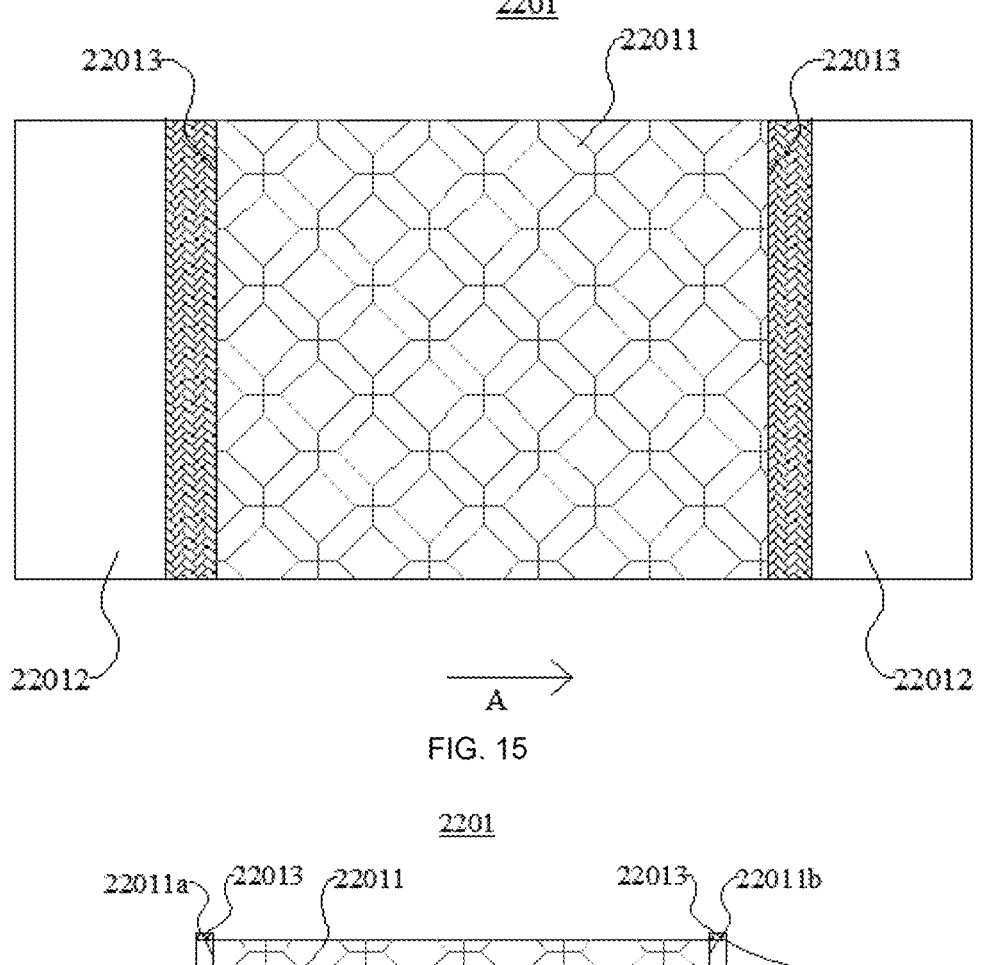
FIG. 15 is a schematic structural top view of the current collector of the eighth design provided in some embodiments of the present application.
FIG. 16 is a schematic structural side view of the current collector of a ninth design provided in some embodiments of the present application.

Referring to FIG. 14 to FIG. 16, in some embodiments, according to the sixth example, the seventh example or the ninth example of the first aspect, a tenth example of the first aspect is proposed, wherein the surface of the third metal segment 22012c distributed in the thickness direction B of the current collector is covered with an insulating layer 22013.

The insulating layer 22013 is formed of an insulating material, and the material of the insulating layer 22013 is, for example, an insulating polymer. In some embodiments, the polymer is a rubber material, and the rubber material includes one or more of natural rubber, styrene-butadiene rubber, butadiene rubber, isoprene rubber, neoprene rubber, butyl rubber, nitrile rubber, and silicone rubber.

In this design, in the thickness direction B of the current collector, the insulating layer 22013 is covered on the surface of the third metal segment 22012c, which can avoid the increase of local expansion force caused by the deposition of lithium metal, etc. on the surface of the filler.

In some embodiments, according to the tenth example of the first aspect, an eleventh example of the first aspect is provided, wherein the thickness of the single insulating layer 22013 is 250 nm, and/or the thickness of the single insulating layer 22013 is ≤200 nm.

As an example, the thickness of the single insulating layer 22013 is, for example but not limited to, any point value or a range value between any two of 50 nm, 80 nm, 100 nm, 120 nm, 150 nm and 200 nm.

In this design, by controlling the thickness of the single insulating layer 22013 within a specific range, it can effectively prevent the insulating layer 22013 from being broken down due to too small thickness, and in the thickness direction B of the current collector, also avoid that the insulating layer 22013 arches a separator 223 due to too large thickness.

In some embodiments, according to the first aspect, a twelfth example of the first aspect is proposed, wherein the porous foam metal part 22011 is porous foam copper, and the solid metal part 22012 is solid copper.

In this design, the porous foam metal part 22011 and the solid metal part 22012 are both made of copper, and the current collector 2201 can be better used as the negative current collector 2211.

According to some embodiments of the present application, referring to FIG. 14 and FIG. 15, the current collector 2201 is a negative current collector 2211, the porous foam metal part 22011 is porous foam copper, and the solid metal part 22012 is solid copper. The first edge 22011a and the second edge 22011b are respectively integrally connected with a solid metal part 22012, and each solid metal part 22012 is composed of a first metal segment 22012a, a second metal segment 22012b and a third metal segment 22012c, and the surface of the third metal segment 22012c distributed in the thickness direction B of the current collector is covered with an insulating layer 22013.

According to some embodiments of the present application, referring to FIG. 16, the current collector 2201 is a negative current collector 2211, the porous foam metal part 22011 is porous foam copper, and the solid metal part 22012 is solid copper. The first edge 22011a and the second edge 22011*b* are integrally connected with a solid metal part 22012 respectively, wherein one of the solid metal parts 22012 is composed of a first metal segment 22012*a*, a second metal segment 22012*b* and a third metal segment 22012*c*, and the other solid metal part 22012 is composed of a third metal segment 22012*c*, and the surface of the third metal segment 22012*c* distributed in the thickness direction B of the current collector is covered with an insulating layer 22013.

In a second aspect, the present application provides an electrode plate 220 including the current collector 2201 according to the above-mentioned embodiment.

The electrode plate 220 may be a positive electrode plate 222, and the positive electrode plate 222 includes the current collector 2201 according to the above-mentioned embodiment. As an example, the porous foam metal part 22011 is porous foam aluminum, which is filled with a positive electrode active material, and the solid metal part 22012 is solid aluminum.

The electrode plate 220 may be a negative electrode plate 221, and the negative electrode plate 221 includes the current collector 2201 according to the above-mentioned embodiment. As an example, the porous foam metal part 22011 is porous foam copper, the pores of which are used to deposit lithium, and the solid metal part 22012 is solid copper.

Referring to FIG. 4, in a third aspect, the present application provides an electrode assembly 22, including a separator 223 and electrode plates 220 according to the above embodiment, wherein in the thickness direction B of the current collector, the separator 223 and the porous foam metal part 22011 are distributed as laminated.

In a fourth aspect, the present application provides a battery cell 20, including a housing 21 and an electrode assembly 22 according to the above embodiment, wherein the electrode assembly 22 is accommodated in the housing 21.

In a fifth aspect, the present application provides a battery 100, including a box body 10 and a plurality of battery cells 20 according to the above-mentioned embodiment, wherein the plurality of battery cells 20 are accommodated in the box body 10.

In a sixth aspect, the present application provides an electric device, including at least one battery cell 20 according to the above embodiment or at least one battery 100 according to the above embodiment.

Figure 17:
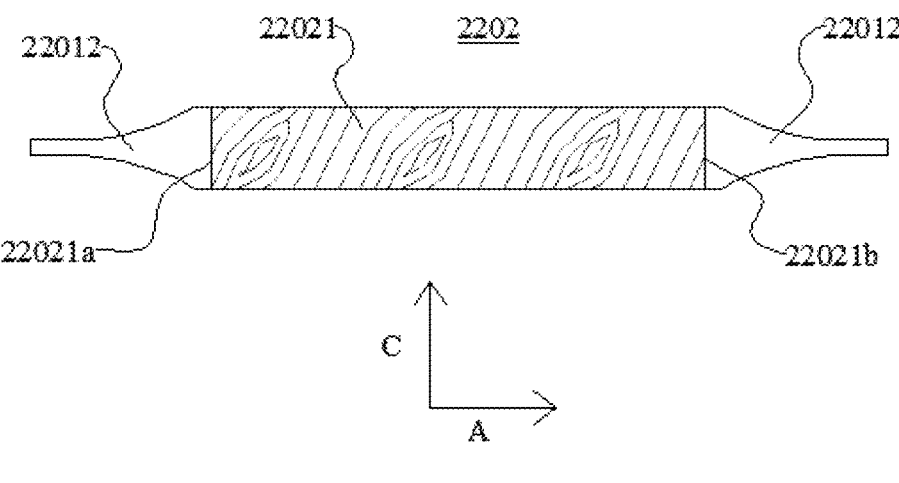
FIG. 17 is a schematic structural side view of the current collector preform provided in some embodiments of the present application.

Referring to FIG. 17, in a seventh aspect, the present application provides a current collector preform 2202, including an alloy part 22021 and solid metal parts 22012. The alloy part 22021 includes a third edge 22021*a* and a fourth edge 22021*b* that are oppositely distributed in the first direction A. The first direction A is perpendicular to the thickness direction C of the current collector preform. The alloy part 22021 is configured to form a porous foam metal part 22011 through dealloying, and the porous foam metal part 22011 is uncompressed. The third edge 22021*a* and/or the four edges 22021*b* are connected with the solid metal part(s) 22012. The solid metal part 22012 is configured to not participate in the reaction during the dealloying, so that the solid metal part can be retained after dealloying.

The current collector preform 2202 is a preform used for preparing the current collector 2201 according to the above embodiment, that is, the current collector 2201 according to the above embodiment can be obtained by processing the current collector preform 2202.

The current collector preform 2202 may be a current collector preform 2202 of a negative electrode, which is used to prepare the negative current collector 2211, wherein the solid metal part 22012 is, for example, solid copper, and the alloy part 22021 is, for example but not limited to, brass (copper-zinc alloy), bronze (copper-tin alloy), etc.

The current collector preform 2202 may be a current collector preform 2202 of a positive electrode, which is used to prepare the positive current collector 2221, wherein the solid metal part 22012 is, for example, solid aluminum, and the alloy part 22021 is, for example, an aluminum alloy part.

Taking the current collector preform 2202 of the negative electrode as an example for illustration, when the current collector preform 2202 is dealloyed, substances other than copper are removed, an uncompressed porous foam metal part 22011 is formed at the alloy retention part, and the solid metal part 22012 is retained. That is to say, the alloy part 22021 in the current collector preform 2202 corresponds to the porous foam metal part 22011 in the current collector 2201, and the solid metal part 22012 in the current collector preform 2202 corresponds to the solid metal part 22012 in the current collector 2201, therefore, both the alloy part 22021 and the solid metal part 22012 in the current collector preform 2202 can be designed correspondingly with reference to the relevant design methods of the current collector 2201 above, which will not be repeated here.

In the current collector preform 2202, the alloy part 22021 and the solid metal part 22012 are connected with each other by means of, for example but not limited to, casting connection, rolling connection, welding and the like. In an embodiment where the solid metal part 22012 is provided with at least one of the first metal segment 22012*a* and the second metal segment 22012*b*, when manufacturing the current collector preform 2202, exemplarily, the alloy part 22021 is connected with the solid metal part 22012 first and then the solid metal part 22012 is pressed to form the first metal segment 22012*a* and/or the second metal segment 22012*b*.

In the technical solution of the embodiment of the present application, the solid metal part 22012 is connected with the alloy part 22021, enabling it to be conveniently realized by rolling, casting, welding, etc.; the alloy part 22021 is configured to form an uncompressed porous foam metal part by dealloying, and the solid metal part 22012 is configured to be retained after the dealloying, so that the current collector 2201 according to the above embodiment can be obtained just by dealloying the current collector preform 2202.

As an example, the alloy part 22021 is connected with the solid metal part 22012 by rolling, so that the alloy part 22021 and the solid metal part 22012 are in a state of being integrally connected. Correspondingly, in the current collector 2201 prepared from the current collector preform 2202, the solid metal part 22012 is connected with the porous foam metal part 22011 by rolling, and the solid metal part 22012 and the porous foam metal part 22011 are also in the state of being integrally connected.

Figure 18:
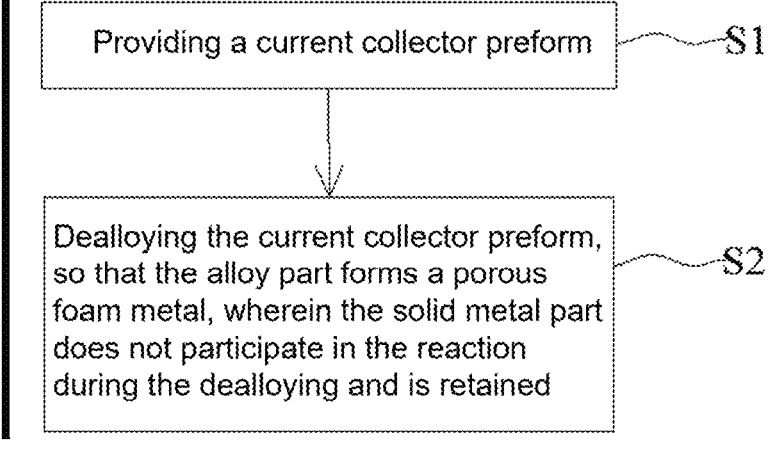
FIG. 18 is a process flow diagram of a method for manufacturing a current collector provided in some embodiments of the present application.

Referring to FIG. 18, in an eighth aspect, the present application provides a method for manufacturing a current collector 2201, including: providing the current collector preform 2202 according to the above embodiment; and dealloying the current collector preform 2202, so that the alloy part 22021 forms the porous foam metal part 22011, wherein the solid metal part 22012 does not participate in the reaction during the dealloying and is retained.

The porous foam metal part 22011 formed by dealloying is uncompressed.

Providing the current collector preform 2202 may refer to preparing a current collector preform 2202, or directly using a prepared current collector preform 2202.

In the technical solution of the embodiment of the present application, the current collector preform 2202 according to the above embodiment is provided, and then is subjected to dealloying treatment, so as to conveniently manufacture the current collector 2201 according to the above embodiment.

According to some embodiments of the present application, a method for manufacturing the negative current collector 2211 includes: placing solid copper at two sides of the alloy copper respectively, making the alloy copper and the solid copper connected together by rolling, and then performing a preset pressing treatment on the preset solid copper according to a specific metal segment design, to obtain the current collector preform 2202 in which the solid metal part 22012 is integrally connected to two side edges of the alloy part 22021, wherein the solid metal part 22012 has a specific metal segment design structure; and dealloying the alloy part 22021 of the current collector preform 2202.

Figure 19:
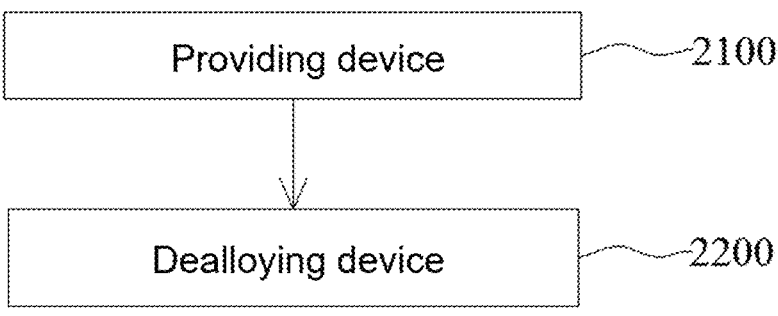
FIG. 19 is a schematic structural view of equipment for manufacturing a current collector provided in some embodiments of the present application.

Referring to FIG. 19, in a ninth aspect, the present application provides equipment 2000 for manufacturing a current collector, including a providing device 2100 and a dealloying device 2200, wherein the providing device 2100 is used to provide the current collector preform 2202 according to the above embodiment; and the dealloying device 2200 is used to dealloy the current collector preform 2202, so that the alloy part 22021 forms a porous foam metal part 22011, wherein the solid metal part 22012 does not participate in the reaction during the dealloying and is retained.

The porous foam metal part 22011 formed by dealloying is uncompressed.

The providing device 2100 may be a device capable of preparing the current collector preform 2202, or may also be a device for taking and transporting the prepared current collector preform 2202.

In the technical solution of the embodiment of the present application, the providing device 2100 is provided to be used to provide the current collector preform 2202 according to the above embodiment, and the dealloying device 2200 is provided to be used to dealloy the current collector preform 2202, making it convenient to manufacture and obtain the current collector 2201 according to the above embodiment.

Finally, it should be noted that: the above embodiments are only used to illustrate the technical solutions of the present application, rather than being intended to limit it. Although the present application has been described in detail with reference to the foregoing embodiments, the person skilled in the art should understand that: it is still possible to modify the technical solutions described in the foregoing embodiments, or perform equivalent replacements for some or all of the technical features thereof; and these modifications or replacements do not make the essence of the corresponding technical solutions deviate from the scope of the technical solutions of the various embodiments of the present application. All of them should be covered by the scope of claims and description of the present application. In particular, as long as there is no structural conflict, the technical features mentioned in the various embodiments can be combined in any manner. The present application is not limited to the specific embodiments disclosed herein, but includes all technical solutions falling within the scope of the claims.

What is claimed is:

1. A current collector, comprising:
a porous foam metal part, the porous foam metal part comprises a first edge and a second edge oppositely distributed in a first direction, and the first direction is perpendicular to a thickness direction of the current collector and of the porous foam metal part; and
at least one solid metal part, wherein the at least one solid metal part is connected to the first edge and/or the second edge,
wherein the porous foam metal part, including the first edge and/or the second edge to which the at least one solid metal part is connected, is uncompressed,
wherein the at least one solid metal part has a first metal segment; and in the first direction, a thickness of the first metal segment gradually decreases from an end thereof close to the porous foam metal part to an end thereof away from the porous foam metal part; optionally a surface of the first metal segment distributed in the thickness direction of the current collector is an arc-shaped surface, and in the thickness direction of the current collector, the arc-shaped surface bends toward a thickness center of the current collector; and/or the solid metal part has a second metal segment; in the first direction, the second metal segment is connected to the end of the first metal segment away from the porous foam metal part; and a thickness of the second metal segment is equal to a thickness of the end of the first metal segment away from the porous foam metal part, and
wherein the at least one solid metal part has a third metal segment; and in the first direction, the third metal segment is connected between the porous foam metal part and the first metal segment, with a thickness of the third metal segment=(0.95~1)×thickness of the porous foam metal part; optionally the thickness of the third metal segment is equal to the thickness of the end of the first metal segment close to the porous foam metal part.

2. The current collector according to claim 1, wherein a thickness of the at least one solid metal part is smaller than or equal to a thickness of the porous foam metal part; and/or in the at least one solid metal part connected to the first edge and/or the second edge, in the first direction, a thickness of an end of the at least one solid metal part away from the porous foam metal part is smaller than a thickness of an end of the at least one solid metal part close to the porous foam metal part.

3. The current collector according to claim 1, wherein a surface of the third metal segment distributed in the thickness direction of the current collector is covered with an insulating layer; optionally a thickness of a single insulating layer is ≥50 nm, and/or the thickness of the single insulating layer is ≤200 nm; and optionally the porous foam metal part is porous foam copper, and the solid metal part is solid copper.

4. An electrode plate, comprising the current collector according to claim 1.

5. An electrode assembly, comprising a separator and electrode plates, wherein each of the electrode plates is according to claim 4, wherein in the thickness direction of the current collector, the separator and the porous foam metal part are distributed as laminated.

6. A battery cell, comprising a housing and the electrode assembly according to claim 5, wherein the electrode assembly is accommodated in the housing.

7. A battery, comprising a box body and a plurality of battery cells, wherein each of the plurality of battery cells is according to claim 6, wherein the plurality of the battery cells are accommodated in the box body.

8. An electrical device, comprising at least one battery, each of which is according to claim 7.

9. A current collector, comprising:
a porous foam metal part, the porous foam metal part comprises a first edge and a second edge oppositely distributed in a first direction, and the first direction is perpendicular to a thickness direction of the current collector and of the porous foam metal part; and at least one solid metal part, wherein the at least one solid metal part is connected to the first edge and/or the second edge, wherein the porous foam metal part, including the first edge and/or the second edge to which the at least one solid metal part is connected, is uncompressed, wherein:

the at least one solid metal part has a first metal segment; and in the first direction, a thickness of the first metal segment gradually decreases from an end thereof close to the porous foam metal part to an end thereof away from the porous foam metal part; and the solid metal part has a second metal segment; in the first direction, the second metal segment is connected to the end of the first metal segment away from the porous foam metal part; and a thickness of the second metal segment is equal to a thickness of the end of the first metal segment away from the porous foam metal part, the at least one solid metal part has a third metal segment; and in the first direction, the third metal segment is connected between the porous foam metal part and the first metal segment, with a thickness of the third metal segment=(0.95~1)×thickness of the porous foam metal part, a surface of the third metal segment distributed in the thickness direction of the current collector is covered with an insulating layer, and a thickness of a single insulating layer is ≥50 nm, and/or a thickness of the single insulating layer is ≤200 nm; and the porous foam metal part is porous foam copper, and the solid metal part is solid copper.

* * * * *